United States Patent [19]
Quint

[11] 3,847,665
[45] Nov. 12, 1974

[54] METHOD AND APPARATUS FOR REMOVING FILAMENTS FROM THE AXLE OF A CASTER

[75] Inventor: Henry J. Quint, Grandville, Mich.

[73] Assignee: Rapistan Incorporated, Grand Rapids, Mich.

[22] Filed: May 4, 1973

[21] Appl. No.: 357,246

[52] U.S. Cl............... 134/6, 15/306 R, 16/41 R, 83/490, 134/21, 280/158 R
[51] Int. Cl. .................. B08b 1/04, B60s 1/68
[58] Field of Search............. 134/6, 21; 15/306 R; 83/490, 471.2, 477.1, 477.2; 280/158 R; 16/41

[56] References Cited
UNITED STATES PATENTS

| | | | |
|---|---|---|---|
| 3,222,708 | 12/1965 | Butsch | 16/41 |
| 3,380,331 | 4/1968 | Boothe, Jr. et al. | 83/490 X |
| 3,744,080 | 7/1973 | Smith, Jr. | 280/158 R X |
| 3,801,129 | 4/1974 | Kotzin, Jr. | 280/158 R X |

Primary Examiner—S. Leon Bashore
Assistant Examiner—Richard V. Fisher
Attorney, Agent, or Firm—Price, Heneveld, Huizenga & Cooper

[57] ABSTRACT

A machine for cutting away accumulated filaments wrapped around the axle of a cart mounted caster includes a guide track for positioning the cart with the caster in alignment on the machine. Once positioned, a clamping assembly secures the caster in position and a cutter assembly having cutting wheels aligned with the axle of the caster on either side of the caster wheel is actuated. The cutter assembly controls the position of the cutting wheel to travel around the axle in an arc of approximately 180° cutting at a predetermined distance from the axis of the axle to remove the accumulated filament materials. The clamping assembly is then actuated to release the caster. Control means are included for controlling the clamping and cutting sequence once the caster is positioned on the machine and the cycle of operation is initiated.

24 Claims, 14 Drawing Figures

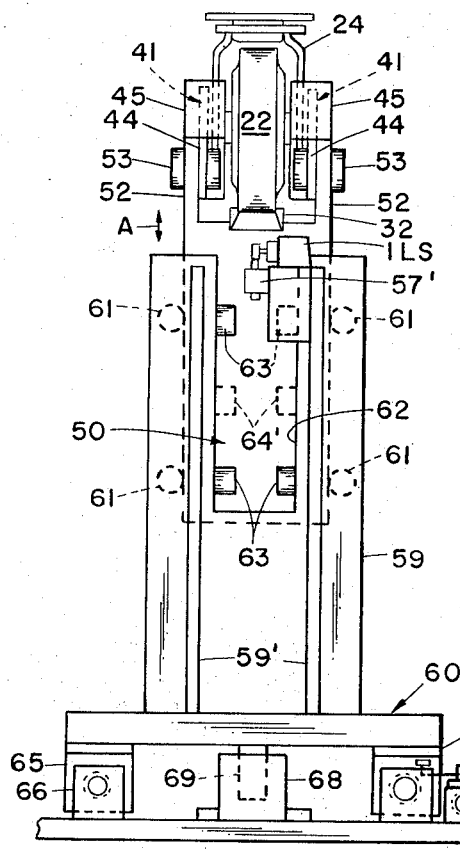
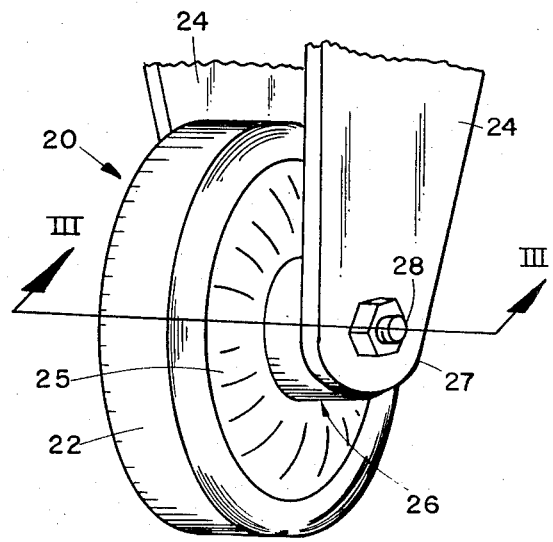
FIG 2
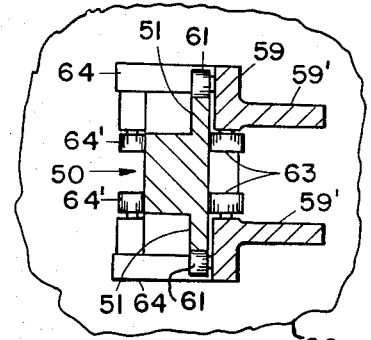
FIG 7
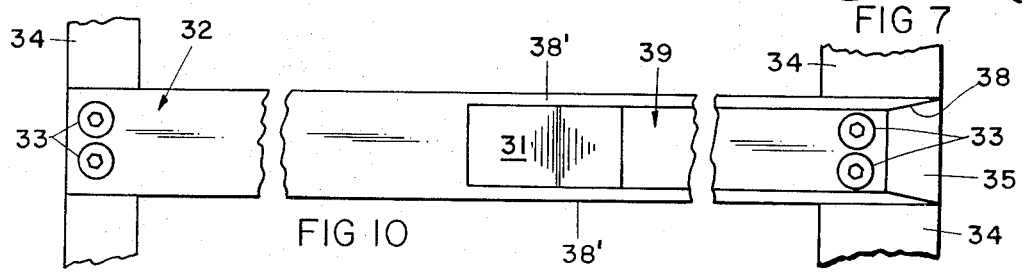
FIG 10
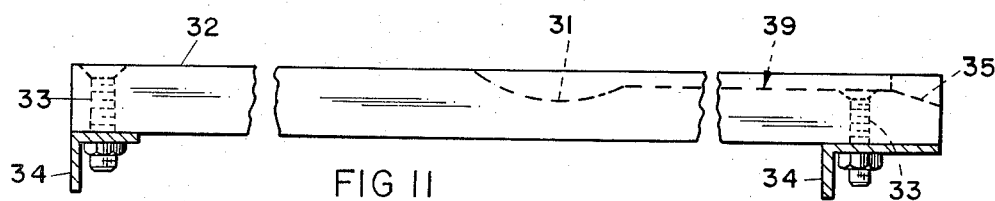
FIG 11

PATENTED NOV 12 1974

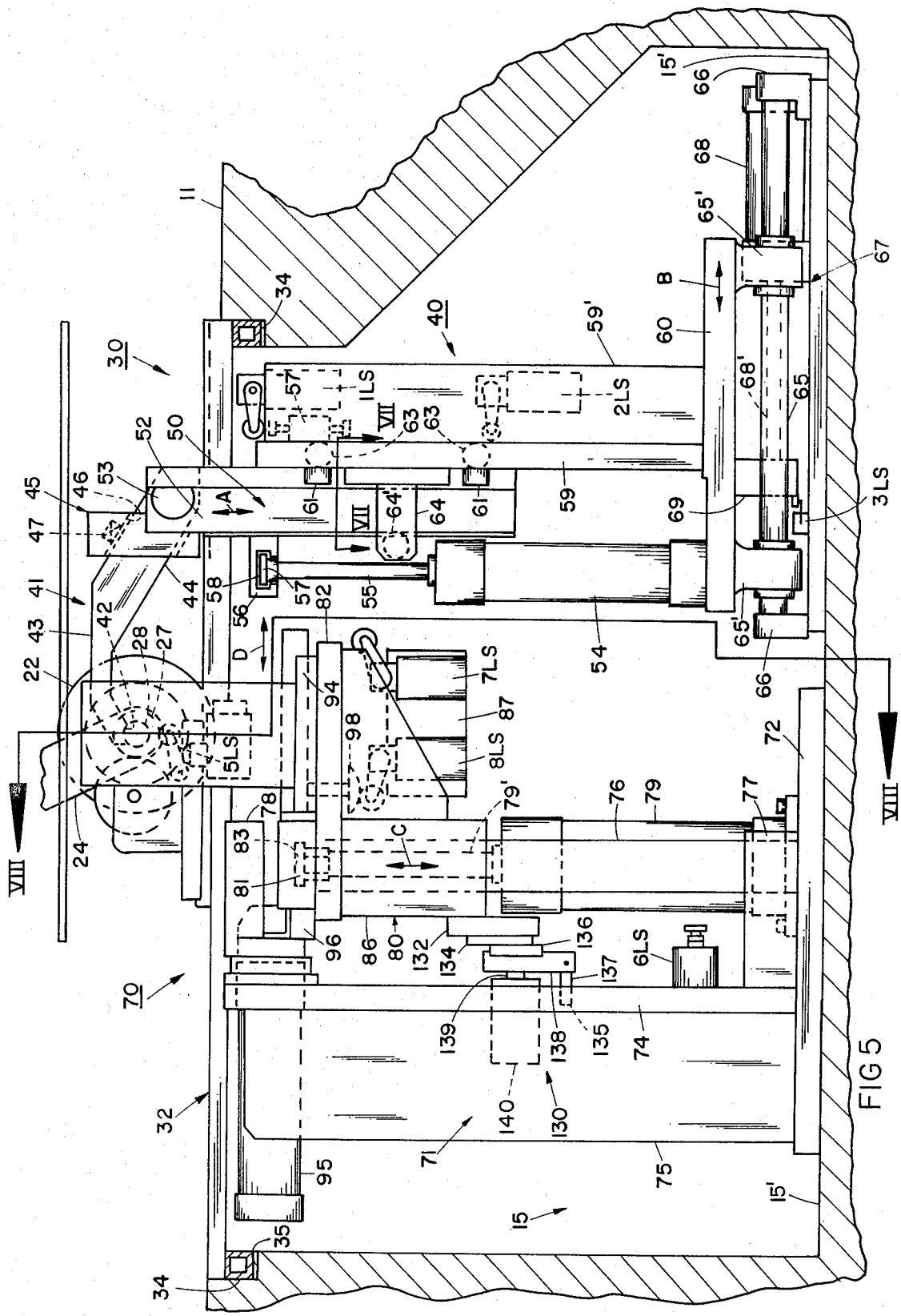

METHOD AND APPARATUS FOR REMOVING FILAMENTS FROM THE AXLE OF A CASTER

BACKGROUND OF THE INVENTION

The present invention relates to a machine for removing accumulated filaments from a caster.

In many facilities where synthetic or other fibrous materials are employed, bolts of the material are transported on carts adapted to carry several such bolts from storage to processing areas. Such installations are common, for example, in the textile industry where typically several carts are used, each of which being mounted on casters to facilitate transporting the material.

During the transportation of bolts of material in this manner, invariably the ends of the bolts fall loose and become entwined with or contact the casters as the cart is moved. Additionally, the casters tend to pick up loose fibers on the floor of the installation. Irrespective of the source or the filaments, they accumulate around the axle of the casters due to the motion of the wheel within the frame of the caster.

During the use of the cart, therefore, filaments of fibrous materials tend to wrap around the axles until, in severe cases, the casters become immobile and frozen thereby rendering the cart inoperative. In many installations, the problem has been solved by periodically disassembling the caster and manually removing the accumulated fiber material. Such a manual procedure requires the cart to be tilted on a side to gain access to the casters. In a typical installation where several carts, each with four casters, are employed, the maintenance procedure requires many man hours each week. Typically, the maintenance area is remote from the normal traffic pattern of the carts thus consuming even more time in transporting the manually operated carts to and from the remote area.

An attempt at a more direct solution to the problem has been made by designing the casters with a non-rotating bushing spaced between the caster wheel and the mounting brackets. Although the bushing reduces the accumulation of fibers that normally would attach to a rotating axle and wrap around the caster during its motion, the movement of the wheel itself is sufficient to cause the accumulation of fibers. Thus, known solutions have not been successful in eliminating the problem and only crude manual methods of maintenance have been provided for removing the accumulated fiber to keep the carts in operation.

SUMMARY OF THE INVENTION

The present invention provides method and apparatus for removing fibrous material accumulated on casters by cutting the entwined fibers from the axle without necessitating tilting of the cart or disassembling the casters. The machine includes aligning means such that the cart can be pushed onto the machine with the caster in predetermined alignment therewith. Once an automatic control sequence is initiated, a clamping apparatus secures the caster to the machine and a cutting wheel assembly controls the positioning of a cutting wheel to travel around the axis of the axle at a predetermined distance therefrom and on either side of the caster wheel and through an arc sufficient to remove the accumulated fibers. The clamping mechanism is then released and the cart is removed from the machine.

By using the system of the present invention, the maintenance time required is greatly reduced thereby lessening the down time of the carts. The machine of the present invention can be positioned in the normal traffic path of the carts such that periodic removal of the fibers can be accomplished during their use without requiring the transportation of the carts to and from a remote area. This also reduces the time the carts are out of service.

It is an object of the present invention, therefore, to provide a method and apparatus for removing material accumulated on a caster.

Another object of the present invention is to provide a machine which includes a controlled cutting wheel for cutting accumulated material from a caster.

Another object of the present invention is to provide a machine for holding a caster in predetermined relationship to a cutting assembly which includes a cutting wheel controlled to travel around a portion of the periphery of the axis of rotation of the caster to cut away accumulated material.

An object of one aspect of the present invention is to provide a machine for cutting away material accumulated around a caster by employing a controlled cutter assembly together with means for controlling the positioning of the caster and the cutting head assembly in a predetermined sequence.

These and other objects of the present invention will become apparent upon reading the following description thereof together with the accompanying drawings in which:

BRIEF DESCRIPTION OF THE DRAWINGS

FIG. 2 is an enlarged fragmentary perspective view of one of the caster assemblies of the cart;

FIG. 5 is a right side elevational view of the machine of FIG. 4 shown with the shrouds removed;

FIG. 6 is a rear view of the machine shown in FIG. 4;

FIG. 7 is a cross-sectional view of a portion of the machine shown in FIG. 5 taken along the lane VII—VII in FIG. 5;

FIG. 10 is a plan view of only the guide rail shown in FIGS. 1, 5, 6 and 8;

FIG. 11 is a side elevational view of the guide rail shown in FIG. 10;

DETAILED DESCRIPTION OF THE PREFERRED EMBODIMENT

Figure 1:
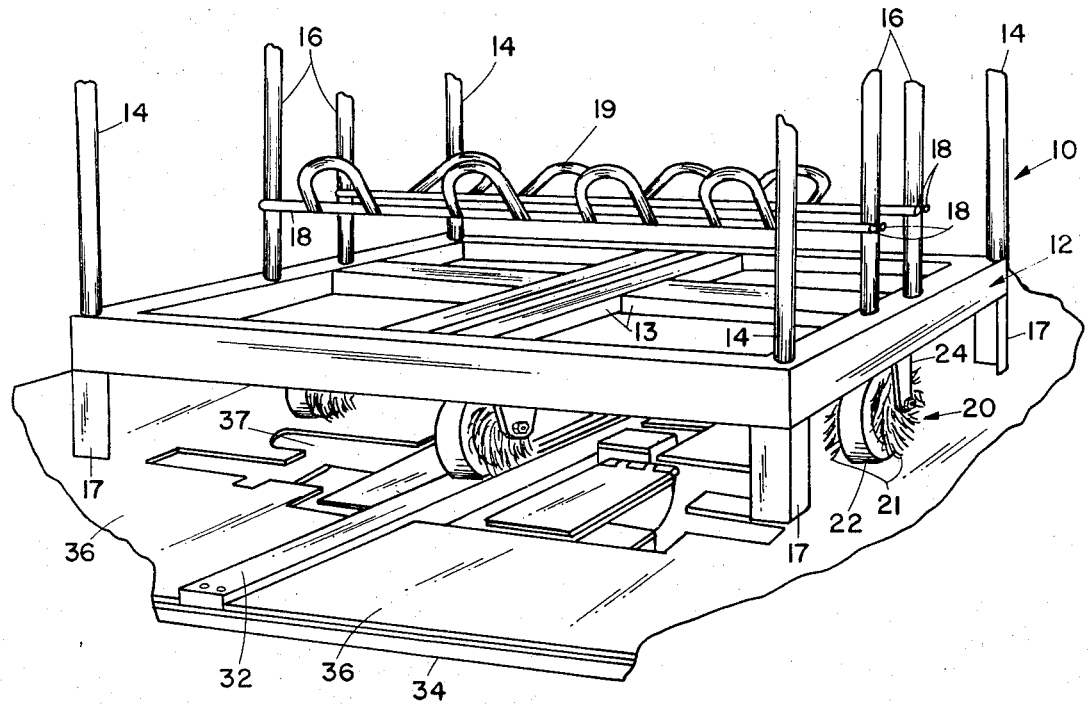
FIGS. 1 is a fragmentary front perspective view of a cart in operative position on the machine of the present invention.

Referring now to FIG. 1, there is shown the bottom portion of a cart 10 positioned in operative alignment with the machine of the present invention. Cart 10 includes a base comprising rectangular frame 12 with cross members 13 and vertically extending corner posts 14. Intermediate the corner posts and extending from opposite sides of frame 12 is a pair of spaced vertically extending support members 16. Coupled on opposite sides of each member 16 and extending between corresponding members 16 on opposite legs of frame 12 are spanning members 18. Extending in angular relationship to the frame 12 and welded to the horizontal spacing members 18 at spaced intervals are holding loops 19. Bolts of fabric (not shown) woven from individual fibers are positioned over the loops 19 and held thereon as the cart is used to transport the material. It is understood that the cart includes a pluraility of spanning members 18 spaced vertically between members 16 each including several loops extending therefrom such that a cart can transport a relatively large number of bolts of material.

Figure 4:
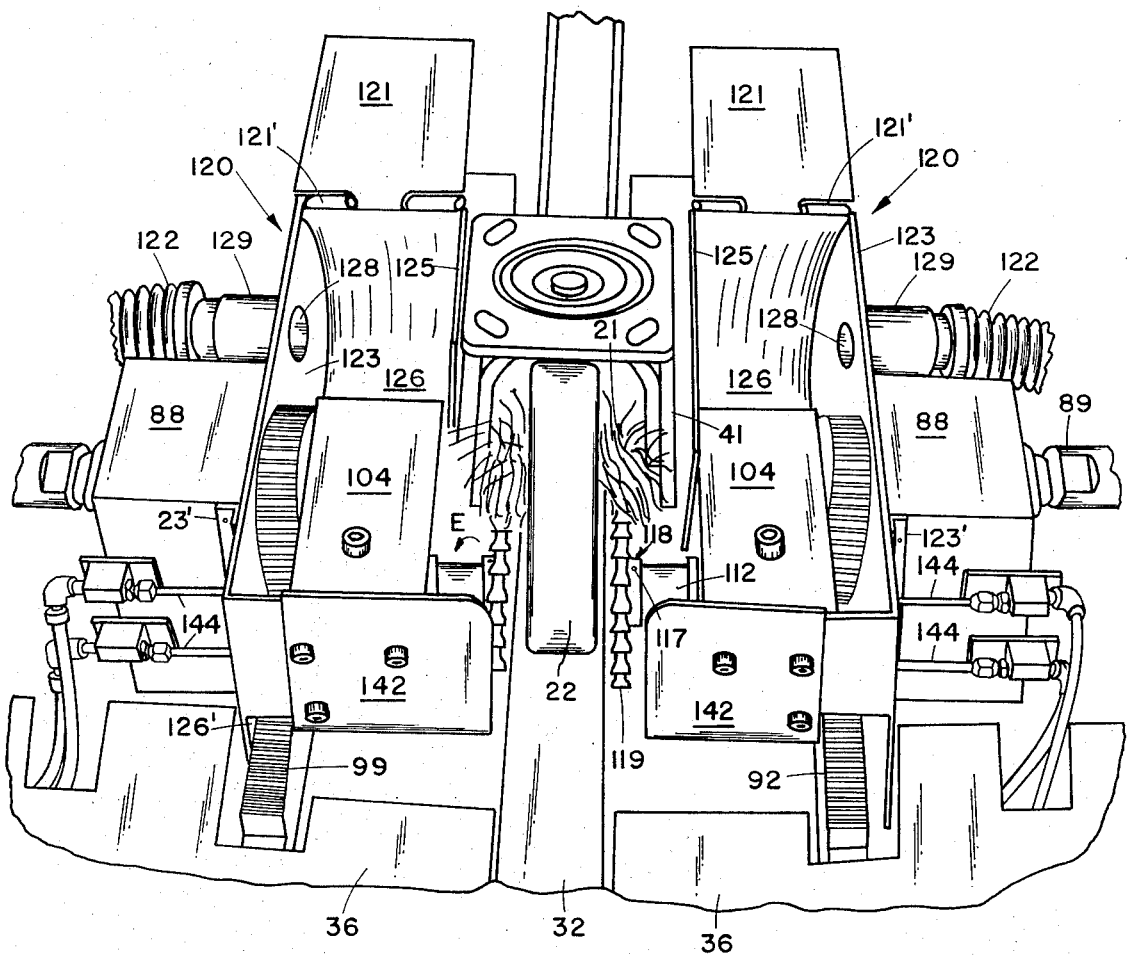
FIG. 4 is a fragmentary front perspective view of the achine of the present invention shown with a caster assembly positioned in operative relationship thereto.

The cart 10 is movable around the floor 11 (FIG. 5) of the installation on a plurality of caster assemblies 20 suitably bolted to the frame 12. Depending downwardly from the corner of the base are bumper segments 17 which aid in preventing the free ends of the bolts of material from contacting the casters. As noted above, however, frequently the free ends become entwined with the casters. Additionally, the casters pick up fibers lying on the floor of the installation such that an accumulation of fibers 21 becomes wrapped around the caster wheels on opposite sides thereof as seen in FIGS. 1 and 4.

Figure 3:
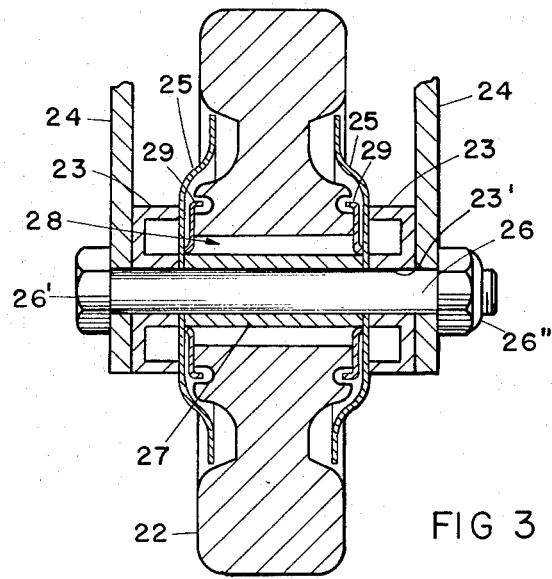
FIG. 3 is a cross-sectional view of the caster assembly shown in FIG. 2 taken along the plane III—III in FIG. 2.

The caster construction as seen in FIGS. 2 and 3 includes a frame including a pair of spaced axle support members 24 extending downwardly from the base of the cart (FIG. 1) and spanning the caster wheel 22. An axle bolt 26 includes a spanner 27 positioned thereon as seeen in detail in FIG. 3. A roller bearing 28 is in turn fitted over the spanner. Wheel 22 is then fitted onto bearing 28 as seen in FIG. 3. A pair of dust caps 29 secure bearing 28 to spanner 27. A pair of thread guards or hub caps 25 is secured to spanner 27 at opposite ends thereof by the compression of spacers 23 fitted over bolt 26 and between members 24 and caps 25. The bolt includes a head 26' and nut 26" which is tightened to secure the assembly. This construction allows wheel 22 to rotate without causing the rotation of hub caps 25 or spacers 23.

Spacers 23, which in the preferred embodiment are bushings, as seen in FIG. 3, include a central aperture 23' adapted to allow bolt 26 to pass therethrough and comprises an annular ring of generally U-shaped cross section. The spacers have an outer diameter of approximately 1¾ inches and are approximately one-half inch wide in the preferred embodiment.

These dimensions may be varied but if they are changed, the filament cutter machine must be adjusted to accommodate this change to assure movement of the cutters about the bushings in such a manner that the filaments will be effectively removed. This is particularly true of the diameter of the bushings.

The bushings 23 are fabricated with parallel end faces to assure a tight fit against both the legs or fork members 24 and the thread guards 25. This is important to eliminate any space or gap between the bushings and either the legs 24 or the thread guards 25 which could collect filaments where they would be inaccessible to the filament cutters.

When the nut 26" is securely tightened to effect this tight engagement, the bushings are securely held against rotation. It will be seen that the ends of the legs 24 are shaped and sized so that the end of the bushings are covered. This facilitates in eliminating unnecessary filament collecting shoulders or pockets.

The bushings 23 are fabricated of a material which can be readily cut by the teeth of the filament cutters without damage to these teeth. A preferable material is a plastic such as Delrin or Nylon. However, a metal such as aluminum may be employed. This arrangement is important because it permits the cutter, if necessary, to remove a thin surface layer of the bushing to accommodate the bushing diameter to the arc of movement of the cutter thus eliminating the necessity for maintaining expensive, close tolerance control of the bushings' diameter during manufacture. Further, it provides the closest possible fit between the bushings and the cutter, assuring total removal of accumulated filaments. It is also significant that these functional advantages are obtained without intervention by the operator or the cutter. This shaving action by the cutters will remove a very thin layer, only a few thousandths of an inch in most cases.

The machine employed to provide the steps of holding one of the casters of the cart in predetermined relationship, clamping the caster in this position, and removing the filament material from the caster comprises guide means, clamping means and cutting means movably controlled around a portion of the periphery of the axle for cutting away the filament material. As best seen in FIG. 5, the guide means includes guide assembly 30, the clamping means includes a clamping assembly 40 and the cutting means includes cutting assembly 70.

In the preferred embodiment as seen in FIG. 5, the machine is mounted within a pit 15 below the floor level and is rigidly attached to a subfloor 15' with the guide assembly 30 substantially flush with the level of floor 11 of the installation. It is likewise possible to mount the machine above floor level and provide inclined ramps thereto for access with the surface of the ramp being flush with the guide assembly 30.

As seen in FIGS. 1 and 5, assembly 30 includes a guide rail 32 fixedly mounted to a frame 34 which is secured to the floor of the installation in a recess 35 which extends around pit 15 such that the guide rail is rigidly positioned with respect thereto. A removable cover plate 36 covers the pit and includes suitable openings 37 permitting the movable components of the machine to communicate with the caster assembly 20. As seen in FIGS. 1 and 4, cover plate 36 is split into two sections to span the guide rail 32.

The guide rail 32 is shown in detail in FIGS. 10 and 11 and comprises an elongated, generally rectangular member secured to the frame 34 by means of a pair of recessed bolts 33 at opposite ends thereof. Rail 32 has a tapered end 35 for receiving the caster as the cart 10 is pushed onto the platform formed by the cover plates 36 thereby facilitating the positioning of the caster. Tapered end 35 includes inwardly tapered side walls 38 which are parallel along a segment 38 to define a channel 39 which guidably supports the caster. The width of channel 39 is sufficient to permit the wheel 22 of a caster to roll therein while preventing any significant lateral movement thereof.

A semicircular recess 31 is formed in the floor of the closed end of channel 39 and has a radius of curvature roughly corresponding to that of wheel 22 of the caster assembly such that the caster will come to rest within the detent or recess 31 to hold the caster in the position shown in FIGS. 1 and 4. The caster so positioned is in fixed predetermined relationship to the machine with the parallel side walls 38' of channel 39 aligning the caster wheel such that the clamping means 40 can grip the bolt head and nut 26', 26" respectively.

CLAMPING MECHANISM

Continuing now with the description of the machine, the clamping mechanism 40 as best seen in FIGS. 5, 6 and 7, comprises a pair of spaced clamping arms 41 spanning the caster on opposite sides and which are mounted to a clamping elevator comprising a slide 50 in turn mounted to a clamp carriage comprising slide 60. As seen in FIG. 5, arms 41 have ends 42 which are configured to fit over and capture the ends of bolt 26 extending outside the caster frame members 24. From the curved recess in the end of each arm 41, the arm extends upwardly to a horizontal section 43 and then extends downwardly at a widened end 44. The arms are fabricated from relatively thick plate material to provide sufficient strength for holding the caster assembly, as seen in FIG. 5, with approximately 600 pounds holding force during the removal operation.

As seen in FIGS. 5 and 6, the ends 44 of the arms 41 are coupled to the ends of upstanding spaced shoulders 52 of a vertically movable slide 50 by means of pins 53 permitting rotation between arms 41 and slide 50. The arms are constrained to only slight rotation about pins 53 by block assemblies 45 rigidly secured to each of the outer surfaces of shoulders 52 of the slide.

As best seen in FIGS. 5 and 6, each block 45 includes a diagonally extending notch 46 having a width slightly wider than segment 44 of arms 41. A stiff bias spring 47 is fitted within a recess in each block 45 and bears against the upper surface of the associated arm to bias the arm downwardly. This arrangement permits the arms to accommodate any slight surface variations presented by the end 26' of bolt 26 or nut 26" of the caster and still secure the caster in position when slide 50 is lowered to lower the arms into a clamping position.

The vertically movable slide 50 is actuated by a first control cylinder 54 which extends between a second horizontally movable slide member 60 and the first slide 50. Cylinder 54 has a shaft 55 coupled to slide 50 by means of a notched coupling arm 56 (FIG. 5) extending from slide 50 and which moves the slide upwardly when the cylinder shaft is extended from the cylinder and pulls the slide downwardly when the cylinder shaft is retracted. A collar 57 on the end of shaft 55 engages a correspondingly configured notch 58 in arm 56 to provide positive coupling in both directions.

Slide 50 is slidably coupled to a vertically extending support member 59 which, as best seen in FIGS. 5 and 7, has a pair of reinforcement ribs 59' extending rearwardly thereof to secure support member 59 to the second horizontally movable slide 60. As seen in FIG. 7, the body of slide 50 is generally T-shaped in cross section and is held to support member 59 by means of a plurality of rollers permitting vertical motion of the slide in the direction indicated by arrows A in FIGS. 5 and 6.

Side rollers 61 which, as seen in FIGS. 5 and 7, are positioned on member 59 in vertically spaced relationship and contact the opposite ends of flanges 51 extending from one side of slide 50. Support 59 includes a generally U-shaped notch 62, as best seen in FIG. 6, which permits the mounting, in vertically spaced relationship along the edges of notch 62, of a pair of first end rollers 63 which, as seen in FIG. 7, bear against the rear surface of slide 50. Finally, a pair of L-shaped arms 64 extends outwardly from the support member 59, as best seen in FIGS. 5 and 7, and includes thereon a pair of second end rollers 64' which bear against the front surface of slide 50. Thus, as seen in FIG. 7, slide 50 is constrained in a horizontal direction by the rollers 61, 63 and 64' but is free to move vertically upon the actuation of cylinder 54.

Slide 60 is slidably mounted to a pair of cylindrical sleeves 65 (FIGS. 5 and 6) by means of sleeve bushings 65' extending downwardly from the bottom surface of the slide and fitted over sleeves 65. Sleeves 65 are supported at opposite ends by means of blocks 66 rigidly attached to a mounting plate 67 which in turn is attached to the subfloor 15'. An actuation cylinder 68 is anchored to plate 67 and has a movable shaft 68' (FIG. 5) coupled to a downwardly depending boss 69 attached to platform 60 such that as cylinder 68 is actuated, slide 60 moves horizontally in the directions indicated by arrow B.

Thus, the clamping arms 41, as will be discussed below under the heading OPERATION, can be moved vertically, as indicated by arrow A, and horizontally, as indicated by arrow B, in a sequence which brings the clamping arms into position over the ends of bolt 26 and then moved downwardly to securely clamp the caster within the recess 31 of guide track 32.

To facilitate the control of the sequence of operation, several limit switches are employed with the clamping assembly. Slide 50 has a contact block 57' mounted thereon (FIGS. 5 and 6) for contacting end of travel switches 1LS and 2LS positioned on support member 59 and shown in FIG. 5. Additionally, limit switches 3LS (FIG. 5) and 4LS (FIG. 6) on plate 67 contact boss 69 when slide 60 reaches its extreme forward and rearward positions respectively. Also, a pressure switch 2PS (FIG. 14) is suitably positioned to be engaged by arms 41 when in a clamping position to signal this condition. This pressure switch serves another function. Should the operational sequence of the machine be initiated when no caster is present, the failure of the clamping arms to engage a resisting structure will prevent the pressure switch 2PS from generating a signal. In the absence of a signal, the clamping arms will automatically retract without initiation of the cutting cycle. This is an important safety feature for protecting personnel. Having described the guide and clamping means for the machine, a description of the cutting means which includes the cutting assembly 70 follows.

CUTTING ASSEMBLY

Figure 9:
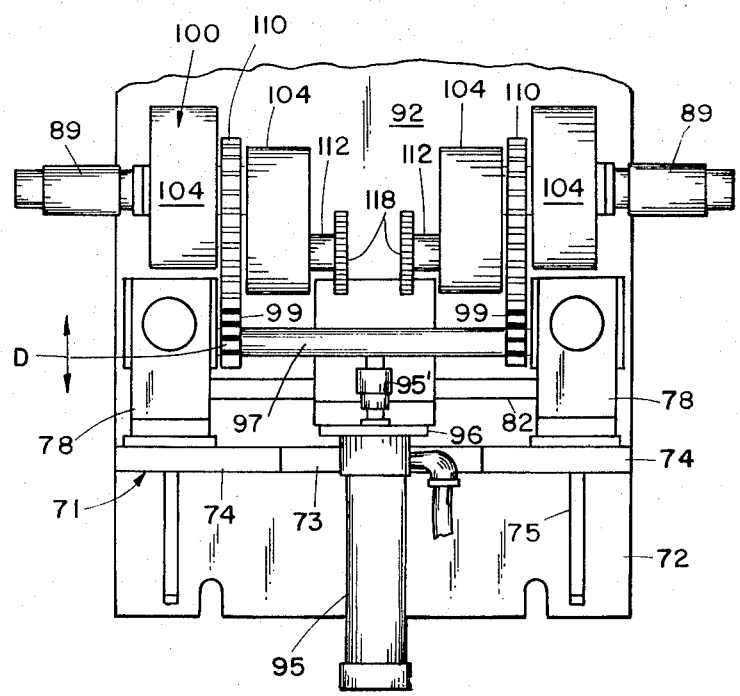
FIG. 9 is a fragmentary plan view of the left portion of the machine as shown in FIG. 5.
Figure 8:
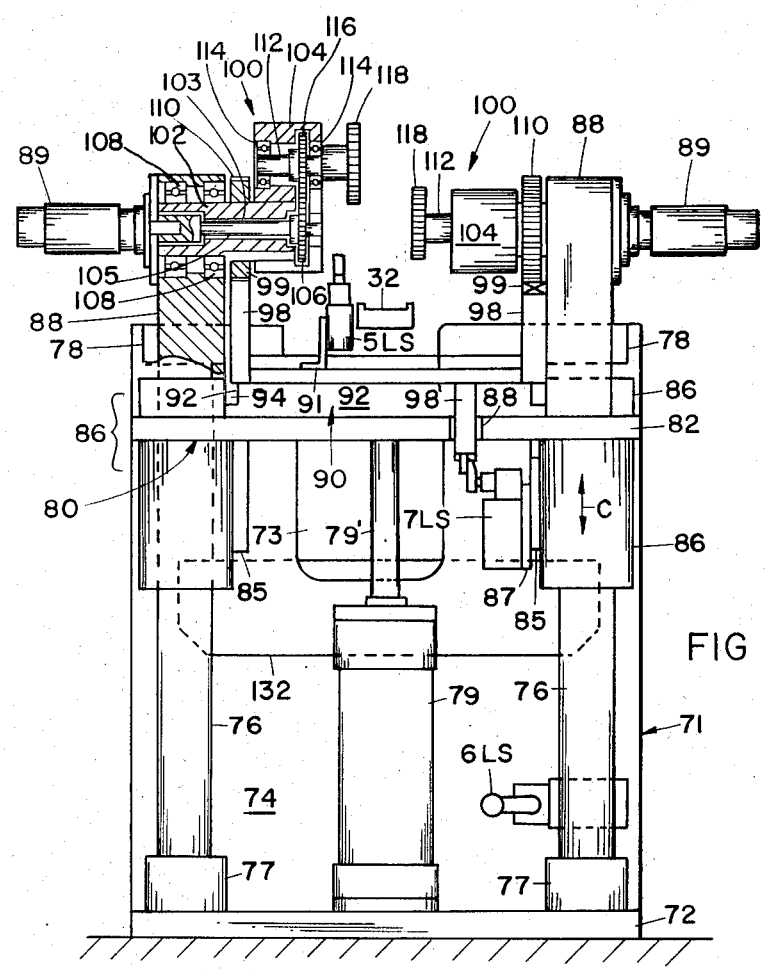
FIG. 8 is a partial cross-sectional view of the machine shown in FIG. 5 taken along the sectional lines VIII—VIII in FIG. 5.

The cutting assembly 70 comprises, as best seen in FIGS. 5, 8 and 9, a support assembly 71 which is fixedly positioned to the subfloor 15'. A cutter elevator comprising a vertically movable platform assembly 80 is slidably supported by assembly 71 and movable in vertical directions indicated by arrow C in FIGS. 5 and 8. A cutter feed comprising a horizontal slide assembly 90 is mounted in slidable engagement to the vertically movable platform assembly 80 and movable in directions indicated by arrow D in FIG. 5. Finally, a cutting head assembly 100 (FIGS. 8 and 9) is supported on the vertically movable platform assembly 80.

The support assembly 71 comprises a base plate 72 with a vertical plate 74 extending therefrom and supported by means of a pair of spaced ribs 75 (FIGS. 5 and 9) to secure plate 74 to base 72. The support assembly further includes a pair of vertically extending cylindrical sleeves 76 mounted between lower support bosses 77 on base 72 and upper support collars 78 extending from the top portion of plate 74. Plate 74 includes a notch 73, as seen in FIGS. 8 and 9, to permit the passage of an actuation cylinder 95 (FIGS. 5 and 9) for the horizontal slide assembly. A pneumatically operated cylinder 79 has one end rigidly coupled to base 72 between sleeves 76, as best seen in FIGS. 5 and 8, and includes a vertically extending shaft 79' which is coupled to platform 82 of the vertically movable platform assembly 80. To assure positive coupling of shaft 79' to platform 82, a collar 81 (FIG. 5) fitted on the end of shaft 79 is T-shaped and is fitted within a correspondingly shaped notch 83 of a coupling block 84 secured to platform 82.

The vertically movable platform assembly further includes a pair of sleeve bushings 86 extending through platform 82 and fitted over sleeves 76 such that when cylinder 79 is actuated, platform 82 is raised or lowered and guidably supported by the sleeves. A pair of generally triangular support braces 85 are coupled between bushings 86 and the lower surface of platform 82 for additional support thereof. The right side brace 85, as seen in FIG. 8, includes a mounting plate 87 for mounting a pair of limit switches 7LS and 8LS (FIGS. 5 and 8). Platform 82 has a notch 88 therethrough (FIG. 8) which permits an actuation arm 98' from the horizontal slide assembly 90 to extend therethrough and actuate switches 7LS and 8LS as described below.

The vertically movable platform assembly 80 further includes a pair of spaced bearing assemblies 88 extending upwardly from opposite sides of the plate as best seen in FIG. 8. Pneumatically operated drive motors 89 are mounted to the bearing assembly 88 to provide motive power for the cutting head assembly 100 as described below. The cutting head assembly 100 is also oupled to the bearing block assemblies 88 by means of a shaft 102 shown in cross section in FIG. 8. Thus, as the platform 82 is elevated and lowered, the entire cutting head assembly and drive motors therefor are likewise raised and lowered together with the horizontal slide assembly thereon.

To assist in securing the platform in a raised position during the cutting operation, a brake assembly 130 is provided (FIGS. 5 and 8) and extends between vertical plate 74 and bushings 86 of the vertically movable platform. Brake assembly 130 comprises an elongated brake shoe 132 (FIGS. 5 and 8) extending between and positioned on bushings 86. A pressure pad 134 (FIG. 5) is mounted to a backing plate 136 in turn coupled to a bracket 138. Bracket 138 is coupled to the shaft 139 of a brake actuation cylinder 140 rigidly mounted to plate 74. A pivotal dowel 137 extending into an aperture 135 in plate 74 provides guided support for bracket 138 when cylinder 140 is actuated as described below to force pressure pad 134 against shoe 132 thereby locking the vertically movable platform in a raised position. When the brake is actuated, a pressure switch 1PS (FIG. 14) suitably positioned to be contacted by the brake shoe is closed to provide a control signal indicating the brake is actuated.

The horizontal slide assembly 90 comprises a sliding plate 92 which rests on the upper surface of platform 82 and is guidably supported thereto by means of a pair of gibbs 94 (FIGS. 5 and 8) which are positioned on opposite sides of plate 92 to engage corresponding longitudinally extending notches 93 in the plate. The gibbs are anchored to platform 82 and the surfaces between plate 92 and platform 82 are suitably lubricated to allow sliding motion therebetween. Cylinder 95 which includes a shaft 95' is secured to the vertically movable platform 82 by means of a mounting bracket 96 (FIGS. 5 and 9). Coupled to sliding plate 92 and extending upwardly therefrom on opposite sides is a pair of rack support plates 98 as seen in FIG. 8. Extending along the top surface of plates 98 and rigidly attached thereto are gear racks 99 (FIGS. 8 and 9).

A cross arm 97 (FIG. 9) extends between plates 98 and is secured therebetween. Shaft 95' of cylinder 95 is in turn coupled to the cross arm 97, as seen in FIG. 9, such that when cylinder 95 is actuated, plate 92 and racks 99 coupled thereto move in a direction indicated by arrow D (FIG. 9).

The cutting head assembly 100, as seen in FIGS. 4, 5, 8 and 9, comprises a pair of identical cutting units, one for each side of the caster. A description of one of these simultaneously controlled units therefor is sufficient for an understanding of the operation of both. It is noted here that in FIG. 8 for the sake of simplification, only one of the cutting units is shown in cross section and in a raised position to better illustrate the internal mechanism.

As best seen in FIG. 8, each cutting unit includes a gear box 104 which is rigidly secured to the rotatable shaft 102 which extends into the bearing block 88. Shaft 102 is a cylindrical shaft having a central opening 103 to permit a drive shaft 105 coupled to the armature of motor 89 to extend through the hollow shaft 102 and couple the armature of motor 89 to a drive gear 106 fitted on the end of drive shaft 105. Shaft 102 is rotatably mounted in bearing block 88 by means of a pair of spaced roller bearings 108. Suitable capture means (not shown) are employed to hold the cylindrical shaft 102 within bearing block 88.

Between gear box 104 and bearing block 88, a gear 110 is fixedly positioned on shaft 102 by key means (not shown). Gear 110 meshes with the associated rack 99, as seen in FIGS. 8 and 9, such that as the rack which is attached to slide 92, moves under the gear 110, the gear rotates shaft 102 which in turn rotates the gear box 104.

Gear box 104 includes a shaft 112 offset from the axis of shaft 103, as seen in FIG. 8, and mounted within the gear box by means of a pair of spaced bearings 114. A follower gear 116 meshes with drive gear 106 on shaft 103 to rotate shaft 112 when motor 89 is actuated. Shaft 112 extends through gear box 104 and a cutting head 118 is secured to the end thereof.

As seen in FIG. 4, each of the cutting heads 118 includes a plurality of cutting teeth around the periphery thereof with blade ends slightly narrower than the width of spacer 23 shown in FIGS. 2 and 3 of the caster assembly. The cutting wheels 118 are positioned in spaced relationship on shafts 116 by means of set screws 117 such that the cutting teeth 119 are centered in relationship to the spacer 23.

Since axle 112 is offset from the axis of rotation of the gear box 104 (i.e., the axis of shaft 103), as the slide mechanism is moved by the actuation of cylinder 95, the cutting head travels in an arc of approximately 180° (for the span of movement of rack 99) which causes the rotating cutting teeth 119 to maintain contact with the periphery of spacer 23 and travel therearound at a predetermined distance from the axis of the caster axle.

The position of the cutting head shown in FIGS. 4 and 9 is with the slide 92 in its forward position and the cutting head also in the forward position. As cylinder 95 is actuated, the racks move toward the rear of the machine causing the rotating cutting head to travel in an arc downwardly and under the axis of the caster wheel. The racks are of sufficient length and the span of travel of the racks assures that the cutting heads span an arc of approximately 180°. This arc is sufficient to assure that the cutting heads remove (by cutting away) the fibrous material 21 from the lower surface of the bushing. As the end of the arc is reached, the fibers across the top of the arc are free to be removed and are pulled away by the cutting action of the teeth 119 of the cutting wheels.

During a complete cycle of operation, the cutting wheel retraces the arc and returns to the forward position shown in FIGS. 4, 5 and 9. In some installations, the fiber cut away from the caster may in turn wrap around the extension of shaft 112. It may be desirable, therefore, to provide a fixed conical shield about the extension of shaft 112 adjacent each of the cutting wheels and mount the conical section to the gear box 104 with a gap between the conical member and the rotating axle 112. Alternately, a milling cutter with a fixed blade can be mounted to the inside surface of gear box 104 to be positioned adjacent the rotating axle 112 thereby clearing the material from the axle during its operation.

The lower travel limit of platform 82 is controlled by the use of a limit switch 6LS (FIGS. 5 and 8) which is attached to the vertical plate 74 and is contacted by the lower edge of bushing 86 to actuate the switch. The upper travel limit of platform 82 is controlled by a second limit switch 5LS, also shown in FIGS. 5 and 8, which is mounted to the vertically movable platform 82 by means of a mounting bracket 91. Switch 5LS is positioned immediately adjacent rail 32 (FIG. 8) such that the actuating arm of limit switch 5LS will contact the lower tip of one of the support forks 24 of the caster assembly as seen in FIG. 5.

The travel limits of the slide 92 and, therefore, the racks 99 which control the rotation of the cutting head assembly 100, are similarly controlled by limit switches 7LS and 8LS mounted as seen in FIGS. 5 and 8. The actuation shoe 98' extending downwardly from slide plate 92 actuates switch 8LS when the racks are in their forwardmost position as seen in the figures. At the end of the arc of travel of the cutting head, member 98' actuates limit switch 7LS to reverse the motion of slide 92.

Figure 12:
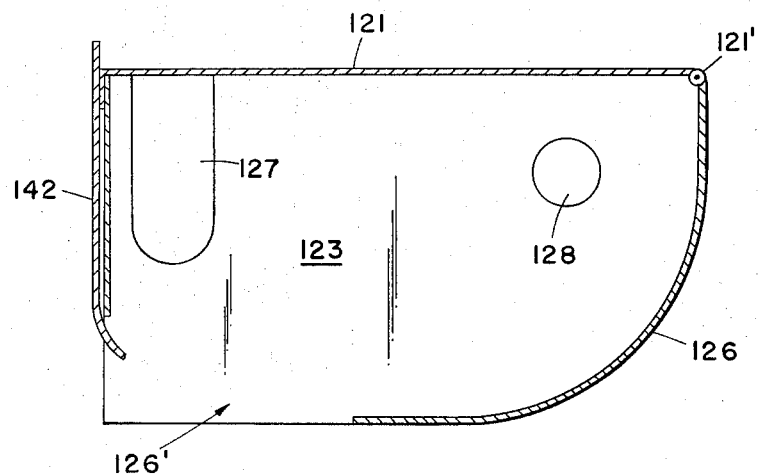
FIG. 12 is a cross-sectional view of the left vacuum housing for the machine as seen in FIG. 4 with the cover shown in a closed position.

In order to remove the fibrous material cut away from the caster, a shroud assembly 120 is provided around each of the cutting head assemblies and is shown in FIGS. 1, 4 and 12. Since the shrouds are identical, only one will be discussed.

Assembly 120 comprises a generally curved enclosure having outer and inner walls 123 and 125 respectively. A curved end wall 126 joins the side walls and provides an arcuate shaped container with a minimum volume. Outer wall 123 includes an elongated slot 127 which permits cylindrical shaft 102 from bearing block 88 to pass therethrough, and a second aperture 128 to which there is secured a collar 129 adapted to be coupled to a vacuum hose 122. The hose 122 is in turn coupled to a vacuum cleaner (not shown) to collect removed materials. The shroud is mounted to the machine by bolting wall 123 to the bearing block 88 by means of brackets 123'.

A cover 121 is hingedly coupled to the end of wall 126 by means of a hinge 121' such that when in an open position shown in FIG. 4, access can be gained to the gear box and drive gears. The shape of each of the shrouds 120 permits the gear box 104 to rotate within the shroud and clear the end wall 126. A notch 126' in wall 126 provides clearance for the moving rack 99 as seen in FIG. 4. A protective plate 142 is bolted to the forward portion of wall 126 and prevents material from the cutting wheels (which rotate in a direction indicated by arrows E in FIG. 4) from being discharged from the shroud.

Thus, it is seen that shrouds 120 move with the vertically movable platform and provide a substantially flush surface when the platform is lowered as seen in FIG. 1.

In order to maintain the gear racks 99 free of material removed from the casters, each of the racks includes a pair of air supplying tubes 144 with nozzles (not shown) positioned within the shrouds 120 and in proximity with the gear rack to provide a stream of pressurized air which blows away filament material which is then drawn into the vacuum cleaning system via hose 122 attached to each of the shrouds. In some installations where the accumulation of cut away fibrous material on the racks is excessive and troublesome, the racks on be replaced by a segment of chain mounted to brackets 98 and spaced above the upper surfaces of the brackets such that filament material can fall through the cross links of the chain. In such case, the drive gears 110 are replaced with a sprocket which mates with the chain and which is secured to shaft 102. Also, the upper surface of the mounting plates 98 in such an installation can be tapered in place of being flat to prevent the adhesion of removed filament material. Having described the structure of the machine, a description of the operation of the device in conjunction with the various control elements shown in the figures is now presented.

OPERATION

Figure 13:
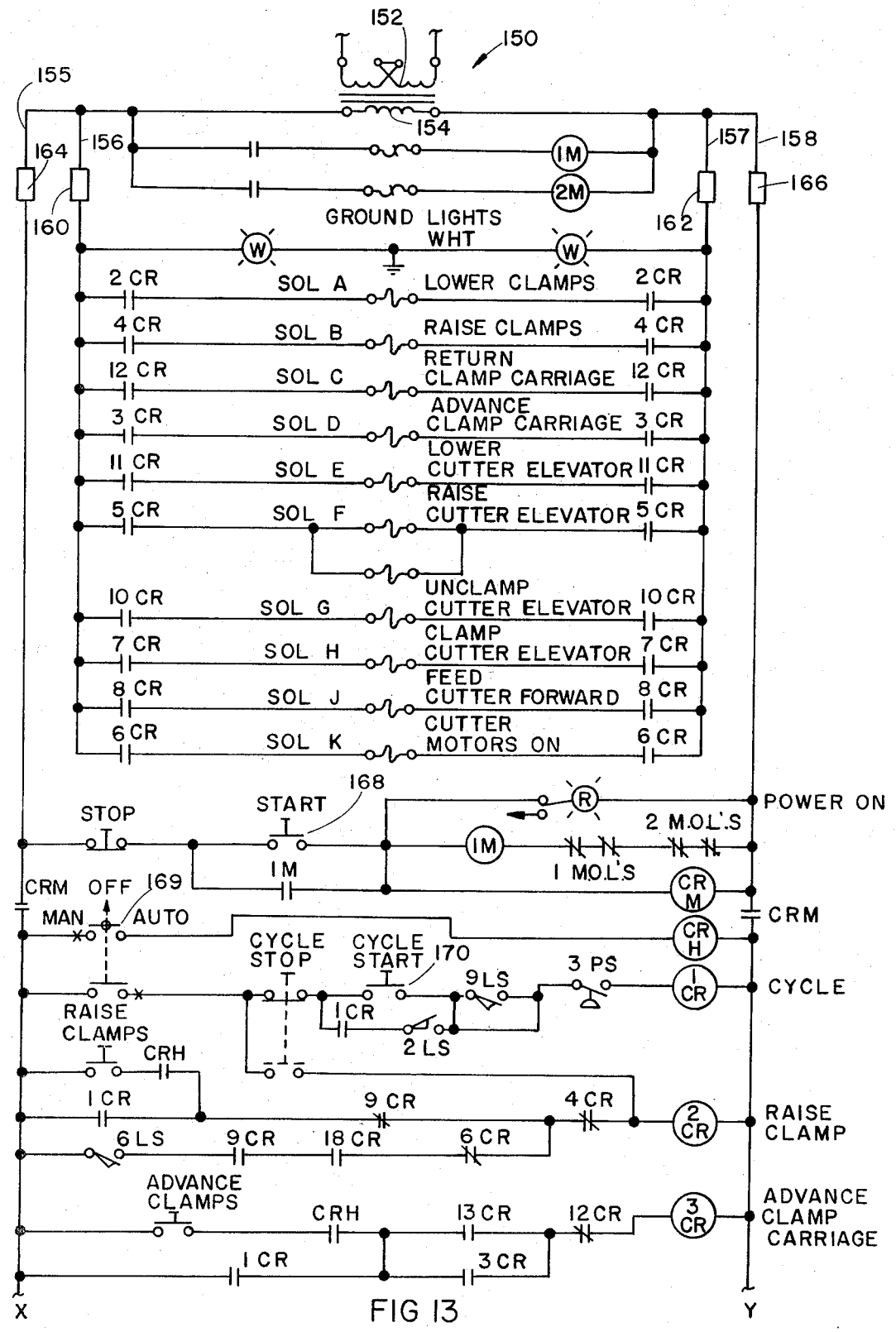
FIG. 13 is an electrical circuit diagram of a segment of the control circuit for the present machine.
Figure 14:
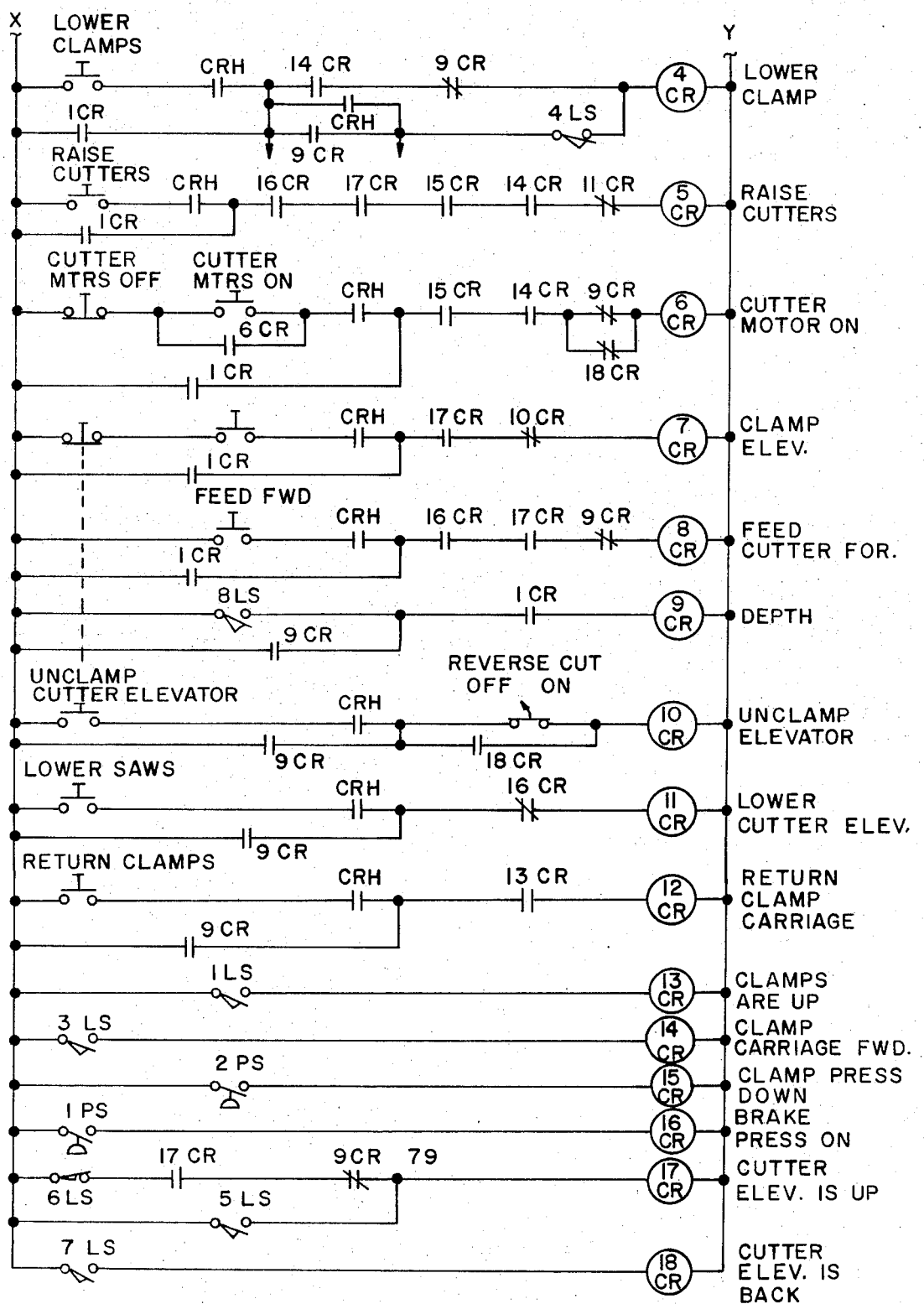
FIG. 14 is an electrical circuit diagram of the remaining segment of the control circuit for the machine.

In referring to the electrical circuit diagrams of FIGS. 13 and 14, which are interconnected by terminals X—X and Y—Y, it is to be noted that solenoids A and B are electrically operated solenoids which actuate the pneumatic cylinder 54 for the clamp elevator. Solenoids C and D actuate valves for cylinder 68 of the clamp carriage, solenoids E and F actuate valves controlling cylinder 79 for the cutter elevator, and solenoids G and H actuate valves to control air pressure applied to the brake cylinder 140. Finally, solenoid J actuates a valve to control cylinder 95 of the cutter assembly feed while solenoid K actuates a valve to de-energize the pneumatically operated saw motors 89. Thus, although the various movable elements are pneumatically powered, the application of pneumatic pressure to actuate the various devices is controlled by the electrical control circuit shown in FIGS. 13 and 14. The control circuit can be constructed in a panel positioned adjacent the machine and electrically coupled thereto by means of suitable interconnecting conductors such that the solenoid valves can be positioned in proximity with the associated cylinders while the associated control relay is mounted in the control panel.

It is seen in FIG. 13 that power is supplied by means of a transformer 150 having a primary winding 152 coupled to a source of electrical energy and a secondary 154 coupled to power supplying conductors 155, 156, 157 and 158. The various solenoid controls are coupled between conductors 156 and 157 by means of fuses 160 and 162 while the remaining control elements are coupled to conductors 155 and 158 by means of fuses 164 and 166. In FIGS. 13 and 14, the function of the various solenoids and control relays is indicated directly on the diagram adjacent the element of interest. Various conventional indicating lights are employed and are not discussed but are shown on the diagram.

A cycle of operation is initated by applying pneumatic pressure to the valves and actuating a main power switch (not shown) to apply power to transformer 150. In addition, the secondary power switch 168 is closed and a switch 169 is closed for the automatic mode of operation. The actuation of switch 168 applies power to control relay CRM which in turn closes its various associated contacts to apply power to the control relays in the lower portion of FIGS. 13 and 14. Closure of switch 169 actuates relay CRH and its associated contacts. The control circuit which is shown in detail in FIGS. 13 and 14 operates in a manner easily understood by those skilled in the art to control the machine as now described.

A cycle of operation is initiated by actuating the cycle start switch 170 which applies power to relay 1CR via pressure switch 3PS which is in its closed position when the pneumatic pressure is present. It is noted here that solenoids A, C, E and G are normally in an energized position and are switched to a non-energized position by the actuation of their associated solenoids. Switches 2LS, 4LS, 6LS and 7LS are in initially closed. As relay 1CR is actuated closing its various contacts, solenoid A is de-energized and solenoid B is energized to actuate cylinder 54 and raise the clamp mechanism which actuates switch 1LS. Switch 2LS is then opened. The actuation of switch 1LS deactuates the valve associated with solenoid C and energizes solenoid D to actuate cylinder 68 to advance the clamping arms 41.

As the slide 60 advances, switch 4LS is opened and 3LS is closed at the end of travel when the arms are positioned over the ends of the caster axle. The actuation of switch 3LS de-energizes solenoid B and energizes solenoid A to actuate cylinder 54 to lower the clamping elevator until the clamping arms firmly grip the caster and hold it in an aligned position in the guide means 30 on the machine and actuate pressure switch 2PS (FIG. 14).

The actuation of switch 2PS initiates the de-energizing of solenoid E and energizing of solenoids F, G and K to actuate cylinder 79 to raise the cutter elevator. Closed switch 6LS opens as the cutting elevator is raised. Once platform 82 is in a position to actuate limit switch 5LS (which contacts the frame member of the caster) the brake mechanism 130 is actuated. Solenoid G is de-energized and solenoid H is energized to actuate the brake cylinder 140. Pressure switch 1PS (FIG. 14) which is positioned on the brake assembly and actuated when the brake is in a locked position, is then actuated in turn actuating solenoid J which initiates the actuation of the cutter feed cylinder 95 and energizes the cutter motors 89. The rotating cutting wheels 118 are at this time positioned with their teeth in contact with spacer 23 and cutting away the filament material 21. Switch 7LS which is in a closed position, opens as the gear racks 99 are moved forwardly by the actuation of cylinder 95. As the racks move under and in engagement with gears 110 of each cutting unit, the rotating cutting wheels 118 circumscribe an arc of roughly 180° around the spacers 23. At the end of travel of slide 92, limit switch 8LS is contacted by shoe 98'. The actuation of switch 8LS energizes relay 9CR shown in FIG. 14. Relay 9CR in turn de-energizes solenoid J causing cylinder 95 to return slide 92 to its initial rearward position again closing limit switch 7LS. During the return stroke of slide 92, cutting heads 118 retrace the circumscribed arc to assure the removal of the filament material.

When limit switch 7LS is closed, solenoid H is de-energized and solenoid G is energized thereby actuating cylinder 140 to unlock the brake mechanism 130 and open switch 1PS. This de-energizes solenoid F and energizes solenoid E to lower the cutter elevator until limit switch 6LS is again actuated. The actuation of switch 6LS de-energizes solenoid K to shut off the air supply to the cutter drive motors 89. At this time also, solenoid A is de-energized and solenoid B is energized to actuate cylinder 54 to raise the clamping arms 41 to release the caster and actuate switch 1LS.

The actuation of switch 1LS de-energizes solenoid D and energizes solenoid C causing the clamp slide cylinder 68 to be actuated to move slide 60 rearwardly until switch 4LS is again closed. The actuation of switch 4LS de-energizes solenoid B and energizes solenoid A to actuate cylinder 54 to lower the clamping elevator which actuates limit switch 2LS and completes the cycle of operation.

The operator then removes the caster from the guide means and positions the next caster of the cart on the guide means such that it is in position to be cleaned. The operation is repeated for each caster on the cart with the machine of the preferred embodiment.

In some installations, it may be desirable to provide four machines to simultaneously clean the four casters of a cart. The specific construction of the cart or truck is only for illustrative purposes. It will be recognized that this invention will be operative with carts or trucks of various designs so long as they are equipped with casters compatible with this invention. Machines embodying the present invention may, of course, be modified by those skilled in the art to substitute structure equivalent to that described in the preferred embodiment. These and other changes, however, will fall within the scope of the present invention as defined by the appended claims.

The embodiments of the invention in which an exclusive property or privilege is claimed are defined as follows:

1. A method of removing material accumulated around the axle of a caster between the caster frame and wheel comprising the steps of:
   providing guide means for receiving a caster wheel;
   positioning the caster on the guide means to align the caster in predetermined orientation;
   providing material removal means;
   clamping the caster in the aligned position on the guide means; and
   circumscribing an arcuate portion of the axle of the caster with the removal means spaced at a predetermined distance from the axis of the caster axle sufficient to remove the accumulated material.

2. The method as defined in claim 1 and including the additional steps of:
   surrounding the removal means with shroud means; and
   drawing air through said shroud means to draw material removed from the axle of a caster away from the space surrounding the caster.

3. The method as defined in claim 1 wherein the clamping step includes the steps of:
   providing at least one clamping member; and
   positioning the clamping member in contact with the caster wheel to hold the caster wheel against said guide means during said circumscribing step.

4. The method as defined in claim 1 wherein the removal providing means includes the additional steps of:
   providing rotatable cutting wheels; and
   rotating said wheels at a speed to cut away material accumulated around the axle of a caster during said circumscribing step.

5. A machine for removing material accumulated around the axle of a caster on a movable cart comprising:
   guide means for receiving and aligning a caster in predetermined relationship to the machine;
   clamping means cooperating with said guide means for securely holding the caster in an aligned position; and
   removal means movable around a portion of the periphery of the axle of the caster at a predetermined distance from the axis of the axle for removing material therefrom.

6. The machine as defined in claim 5 wherein said guide means comprises a guide rail having a floor and upstanding shoulders along opposite sides thereof defining a guide channel therebetween, said floor including a recess formed therein to receive and seat a wheel of a caster when moved into position thereon.

7. The machine as defined in claim 5 wherein said clamping means comprises a pair of clamping arms spaced to span a caster and having ends adapted to capture the axle of a caster, said clamping arms coupled to means for moving said arms between an engaging position for holding a caster to said guide means and a retracted position releasing the caster.

8. The machine as defined in claim 5 wherein said removal means comprises at least one cutting wheel including means for rotating said wheel, and means for controling the position of said cutter wheel to circumscribe an arc around the periphery of the axle of a caster such that said cutting wheel cuts away material accumulated therearound.

9. The machine as defined in claim 8 wherein said removal means comprises a pair of cutting wheels adjustably spaced to align with the space between a caster wheel and axle support means on each side of a caster to remove accumulated material between the wheel and support means on opposite sides of the wheel.

10. In combination, a machine for cutting away filament materials accumulated around an axle of a caster on a cart used in a textile environment, and a caster, the combination comprising:
    a caster including downwardly depending axle support members spanning a wheel rotatably secured between said axle support members by axle means, said caster subject to accumulation of filament material around said axle means; and
    a machine for cutting away accumulated filaments from said caster and including guide means aligning said caster on the machine, clamping means cooperating with said guide means for securing said caster in an aligned position, and cutting means circumscribing an arc around said axle means of said caster to cut away accumulated material.

11. The combination as defined in claim 10 wherein said axle means includes an axle bolt extending through said axle support means and spacer means positioned on said axle bolt on opposite sides of said wheel between said wheel and said axle support members.

12. The combination as defined in claim 11 wherein each of said spacer means comprises an annular member having a circular outer surface of substantially uniform width and a predetermined diameter.

13. A machine for cutting material away from the axle area of a cart mounted caster between the caster wheel and support members on either side of the wheel, said machine comprising:
    guide means for receiving a caster wheel as a cart is moved onto the machine and aligning the wheel in a predetermined position;
    clamping means cooperating with said guide means to secure the caster firmly to said guide means; and
    movable cutting means controlled to circumscribe a portion of the axle area of a caster at a predetermined distance from the axis of the axle in an arc sufficient to remove accumulated material from the caster.

14. The machine as defined in claim 13 wherein said guide means comprises a longitudinally extending guide rail including a floor spanned by shoulders on opposite sides thereof to define a guide channel for guidably receiving a caster wheel.

15. The machine as defined in claim 14 wherein said floor includes a curved recess formed therein for seating the caster wheel in alignment along said rail when positioned thereon.

16. The machine as defined in claim 15 wherein said clamping means comprises a pair of arms spaced to align with the axle means of a caster adjacent the outer surfaces of the axle support members of a caster.

17. The machine as defined in claim 16 wherein said clamping arms are coupled at one end to elevator means for raising and lowering said arms, and wherein said elevator means is coupled to slide means for moving said arms toward and away from the caster when in said predetermined position.

18. The machine as defined in claim 17 wherein said cutting means comprises a pair of rotatable cutting wheels adjustably spaced to align with the axle of a caster on opposite sides of the caster wheel, and means for rotating said cutting wheels in an arc such that the cutting edges of said wheels contact the axle of the caster and circumscribe a portion of the axle as said cutting wheels traverse the arc.

19. A machine for removing material accumulated around a caster or similar object comprising:
   a generally rectangular frame;
   guide means coupled to said frame for receiving a caster wheel thereon and controlling the orientation of the wheel as it is moved on said guide means;
   clamping means cooperating with said guide means to hold a caster in a predetermined position on the guide means, said clamping means comprising a pair of clamping arms with ends adapted to capture projecting ends of the axle of the caster, said arms coupled to a first movable slide assembly for raising and lowering said arms for alternately disengaging and engaging the caster, respectively, said first slide assembly mounted to a second slide assembly for moving said clamping arms toward and away from the caster such that said arms can be retracted or moved into alignment with a caster;
   cutting means comprising a pair of rotatable cutting wheels spaced along an axis to align with the area between the sides of a caster wheel and downwardly depending axle support members, means for rotating said wheels; a first cutter slide assembly for raising and lowering said cutting wheels between a cutting position and a non-cutting position, respectively; a second slide assembly positioned on said first cutter slide assembly; means cooperating between said second slide assembly and said cutting wheels for controlling the movement of said cutting wheels in an arc around the axle of the caster when said second cutter slide assembly moves relative to said first cutter slide assembly; nd control means sequentially actuating said clamping and cutting means to secure the caster on said guide means when said cutting wheels are in an operative cutting position.

20. In combination, a floor supported truck mounted on casters and used in an environment in which filamentary materials collect about the caster axles; each caster having at least one frame member securing it to the truck, a wheel and a bushing spacing the wheel from said frame member; means recessed below the floor having a filament removing member and means for positioning at least one caster on said machine in operative relationship to said filament removing member; said filament removing member having a filament cutter; means for moving said cutter into operative position and to trace a path of movement about said bushing concentric with said bushing.

21. The combination described in claim 20 wherein said bushing is plastic whereby said cutter may engage and remove a surface layer of said bushing without injury to either the bushing or the cutter.

22. In combination with a power cutting means, a portable vehicle for use in an environment in which filamentary materials collect about the supporting wheels of the vehicle; the supporting means of said vehicle having a bifurcated frame with a pair of legs and an axle extending between said legs and including a wheel mounted on said axle, a pair of bushings, surrounding said axle on each side of said wheel for spacing said wheel from each of said legs sufficiently to permit a toothed filament cutting tool of said power cutting means to move into the space between the wheel and said legs, said bushings being of a material which can be readily cut by the teeth of said tool whereby the teeth of the cutting tool may engage and remove a surface portion of said bushings without injury to the cutter.

23. In combination, a powered, toothed cutting machine for use in removing filaments from the casters of a vehicle, and a caster for use on vehicles designed for operation in an environment in which filamentary materials collect around the caster and are periodically removed by said cutting machine, said caster having a forked frame having a pair of spaced legs and a wheel positioned between said legs; an axle mounted on and extending between said legs and supporting said wheel; said wheel being substantially narrower than the spacing between said legs; a pair of bushings, one on each side of said wheel mounted on and surrounding said axle; said bushings being of identical length to center said wheel between said legs; said bushings being of a material readily cut by the teeth of the cutters of said cutting machine whereby a surface layer of the bushings may be removed by the cutters without injury to the cutters.

24. The combination as described in claim 23 wherein said wheel has a non-rotatable thread guard on each side; the peripheries of the ends of said bushings being shaped to seat snugly against both said thread guards and said legs; said bushings being tightly and non-rotatably pressed against both said thread shields and said legs to eliminate all space therebetween into which filaments can enter.

* * * * *